Aug. 16, 1966 R. E. BONNETTE 3,266,439

CONVEYOR SYSTEMS

Filed Aug. 12, 1963 6 Sheets-Sheet 1

Inventor
Roland E. Bonnette
By his Attorney
Robert E. Ross 14
18
24
30
34
26
36
V
V
C1
L1
68
70
P1
20
22
14
26
34
24
30

CONVEYOR SYSTEMS 24
26
32
34
36
22
28
30
14

26

United States Patent Office 3,266,439

Patented August 16, 1966

1

2

3,266,439

CONVEYOR SYSTEMS

Roland E. Bonnette, Hamilton, Mass., assignor to United Shoe Machinery Corporation, Boston, Mass., a corporation of New Jersey Filed Aug. 12, 1963, Ser. No. 301,490

5 Claims. (Cl. 104—172)

This invention relates generally to conveyors, and has particular reference to a conveyor designed for use in the manufacture of shoes, and to means for controlling the operation thereof.

In a copending application Serial No. 158,682, filed December 12, 1961 by Sidney G. Goodrich et al. now Patent No. 3,130,685, there is disclosed a conveyor system comprising a floor-mounted tow chain which is adapted to tow shoe racks from a pool position to various work stations. Means is also provided on the conveyor for releasing racks individually from the pool position, and separate means is provided at each work station for arresting a rack released from the pool position. In another copending application Serial No. 221,552, filed September 5, 1962 by J. Robbins et al., now Patent No. 3,158,105, there is disclosed a novel form of rack stop mechanism which is particularly adapted for use with a conveyor of the type disclosed in the above-identified application.

In another copending application Serial No. 231,810, filed October 19, 1962 by Sidney G. Goodrich, now Patent No. 3,148,634, there is disclosed a novel form of towing arm for use with racks of the type described in the above-identified application.

As illustrated in the above-identified applications, the conveyor chain comprises two parallel runs which travel in opposite directions, and are spaced apart far enough to permit the installation of stop mechanisms between the runs. During operation, racks travel in one direction between work stations disposed on one side of the conveyor chain and travel in the opposite direction between work stations on the opposite side of the conveyor chain.

When a rack arrives at the end of the first run, it has heretofore been necessary to manually remove it from operative relation to the chain, push it around the end of the conveyor and reengage it with the chain. Such procedure requires that either an extra operator be stationed at the end of the conveyor, or that the operator of the machine at the end of the first run be assigned to move the racks around to the other side of the conveyor.

In another application Serial No. 280,237, filed May 14, 1963 by Robert J. Bernard, now Patent No. 3,175,516, there is disclosed a novel mechanism for disengaging a rack from a first run of the conveyor chain, transferring it around the end of the conveyor and causing it to become reengaged with the chain on a second run of the conveyor.

The operation of this latter portion of the conveyor system has been found to be generally satisfactory except on occasions when a rack entering the take-around mechanism is closely followed by a second rack. Since the speed of the take-around is less than the speed of the conveyor chain, the following rack can collide with the leading rack after the leading rack has started around the end of the conveyor and while it is angularly disposed in relation to the following rack. A collision under such conditions can cause inadvertent interlocking of the colliding portions, resulting in damage to the racks.

The object of this invention is to provide a conveyor system of the type described in which means is provided for preventing more than one rack at a time from approaching the take-around mechanism.

A further object of the invention is to provide a control system for use with a conveyor system of the type described in which the entrance of a rack into the take-around mechanism actuates means for preventing a second rack from approaching the take-around mechanism until said rack has been discharged from the take-around mechanism.

Other objects of the invention will be apparent to one skilled in the art from the following detailed description of a specific embodiment thereof.

Figure 1:
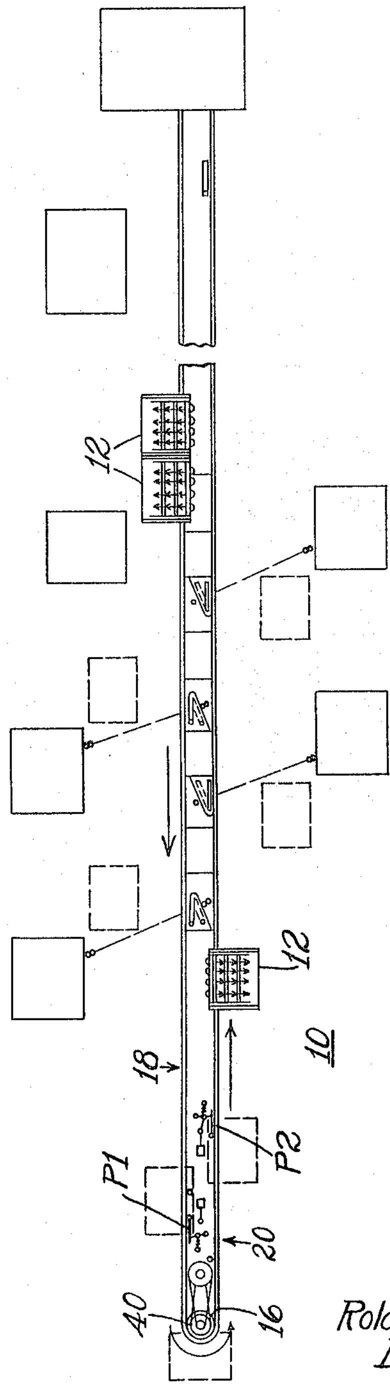
FIG. 1 is a schematic plan view of a conveyor system embodying the features of the invention.

Referring to the drawing, there is illustrated a conveyor system 10, of the type which is adapted to move article carrying devices such as shoe racks 12 or the like between work stations.

The conveyor comprises a continuous chain 14 driven by suitable means (not shown) at one end, said chain traveling around a suitable sprocket wheel 16 at the other end, forming two spaced runs 18 and 20 traveling in opposite directions. As described in the above-identified applications, various types of rack arresting mechanisms may be disposed between the runs.

The rack 12 for use with the conveyor system includes a base 22 supported by suitable casters 23, and is adapted to be towed by the conveyor chain by means of a towing arm 24 which is pivoted to the base at 25 and extends forwardly therefrom, with a latch plate 26 disposed on the end thereof.

The plate 26 has a depending portion 28 for engagement with towing blocks 30 in the chain, and a laterally extending portion 32 for engagement with suitably positioned arresting mechanisms. To maintain the depending portion 28 in a predetermined heightwise relation to the chain, a roller 34 is provided on the towing arm for riding on the top of a towing arm support rail 36 disposed alongside the chain.

In the illustrated embodiment work stations are positioned along both sides of the conveyor runs, with the racks traveling between work stations in the direction indicated by the arrows (see FIG. 1). To provide means for automatically moving a rack around the end of the conveyor from outgoing run 18 to return run 20, a mechanism 40 now to be described is provided at the end opposite the driving mechanism.

The mechanism 40 is operated by the conveyor sprocket wheel 16 and comprises a second sprocket wheel 42 rotatably mounted on the shaft 44 of the conveyor sprocket wheel 16. A rack driving sprocket wheel 46 is also mounted on the shaft 44 and rotatable thereon independently of the rotation of the sprocket wheel 16, and a pair of speed reducing sprocket wheels 48 and 50 are mounted on a shaft 52 spaced from the shaft 44. The sprocket wheel 16, driven by the conveyor chain, drives sprocket wheel 42 which in turn drives by means of a first drive chain 54 the upper sprocket wheel 50 on shaft 52. The lower sprocket wheel 48, driven by shaft 52 drives through second drive chain 56, the rack driving sprocket wheel 46. The ratio of size of the sprocket wheels is such that the speed of rotation of the rack driving wheel 46 is about ⅕ of the speed of the rotation of the conveyor sprocket 16.

Disposed around the conveyor chain sprocket 16 is a guide rail 58 having portions 60 and 62 adjacent the ends of the towing arm support rails 36 which are the same height as said rails, and having a medial portion 64 which is higher than the portions 60 and 62 for a purpose to appear hereinafter.

Figure 5:
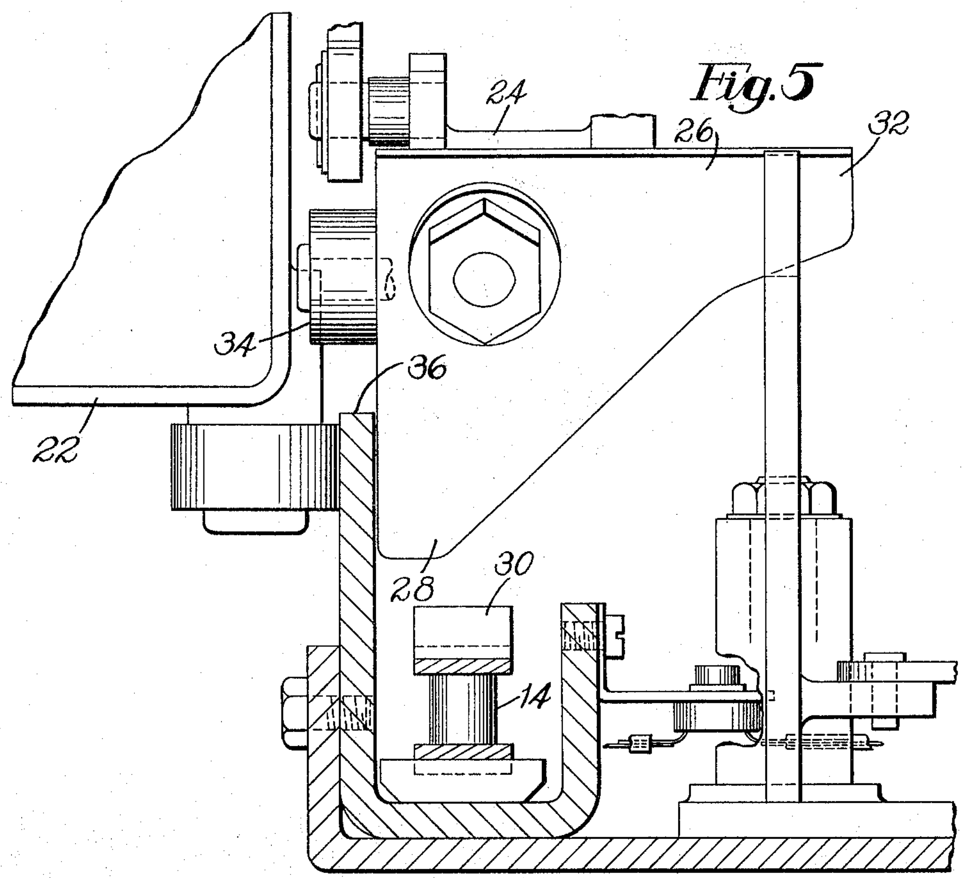
FIG. 5 is a view in section taken on line V—V of FIG. 3 illustrating a latch arm of a rack engaged with the stop member.
Figure 6:
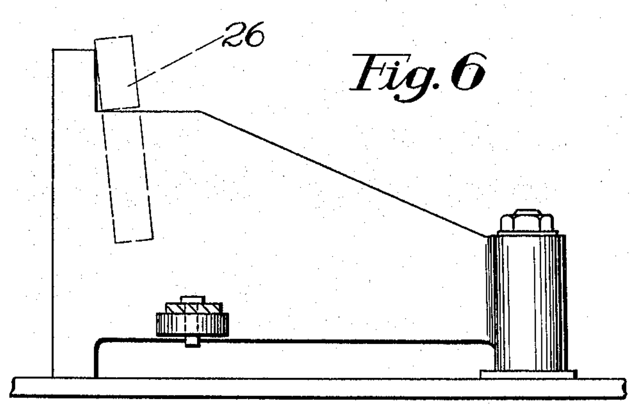
FIG. 6 is a view of FIG. 5 as seen from the right side.
Figure 7:
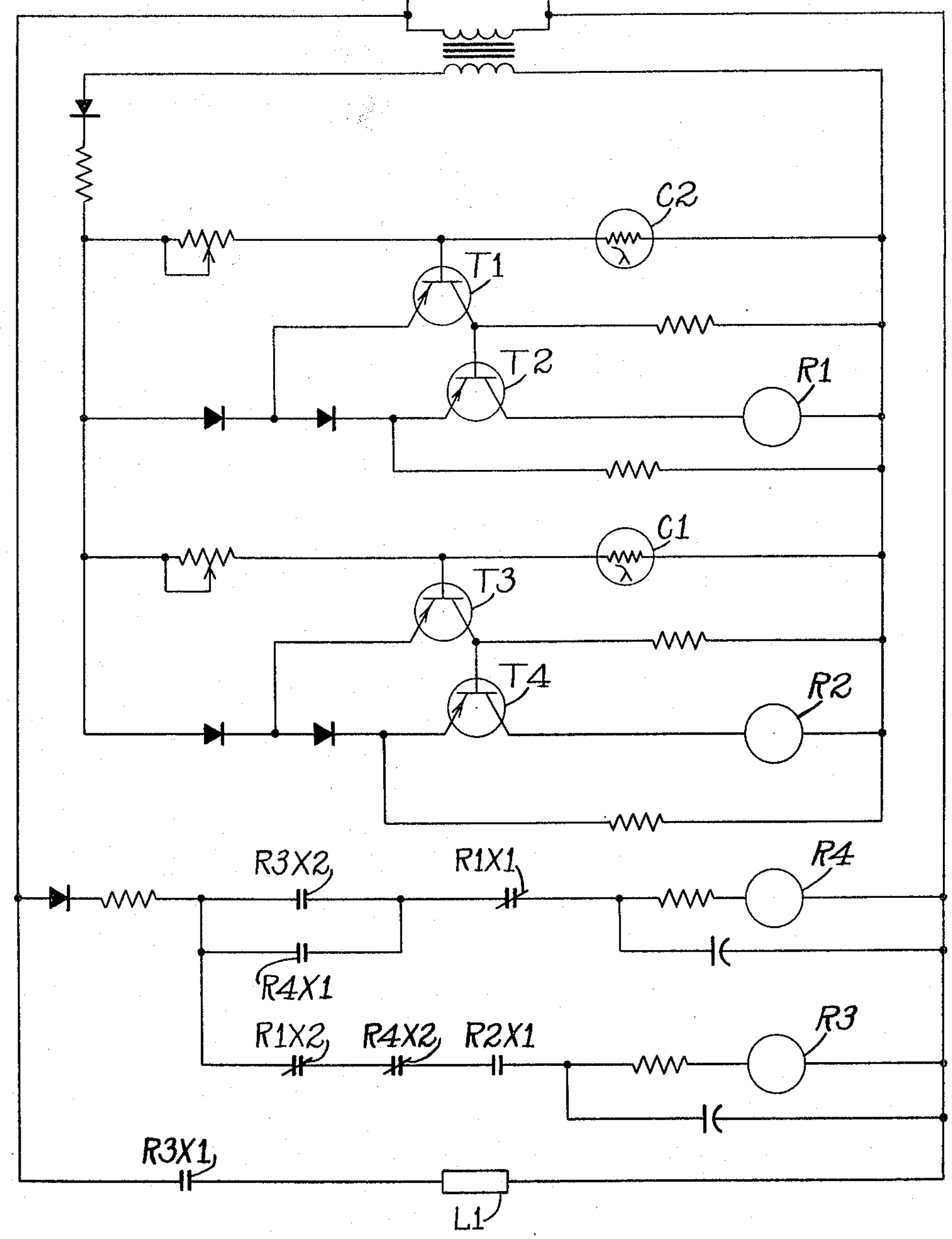
FIG. 7 is a schematic diagram of the control system of the transfer mechanism of the conveyor.

To engage the latch plate of a rack and move the rack around the end of the conveyor the sprocket wheel 46 is provided with a tongue 66 which projects beyond the periphery of the conveyor sprocket 16 and is positioned height-wise so as to engage the latch plate 26 of a rack in a manner now to be described. As a rack 12 is conveyed by the chain 14 toward the mechanism 40, with the roller 34 of the towing arm riding on the support rail 36 and the depending portion 28 of the latch plate engaged by a towing block 30, the roller 34 passes over the end portion 60 of the guide rail 58 and up onto the medial portion 64. The latch plate is thereby lifted out of engagement with the towing block 30, and the rack stops with the roller 34 resting on the elevated medial portion, with the latch plate approximately in the position shown in FIGS. 2 and 5.

Figure 2:
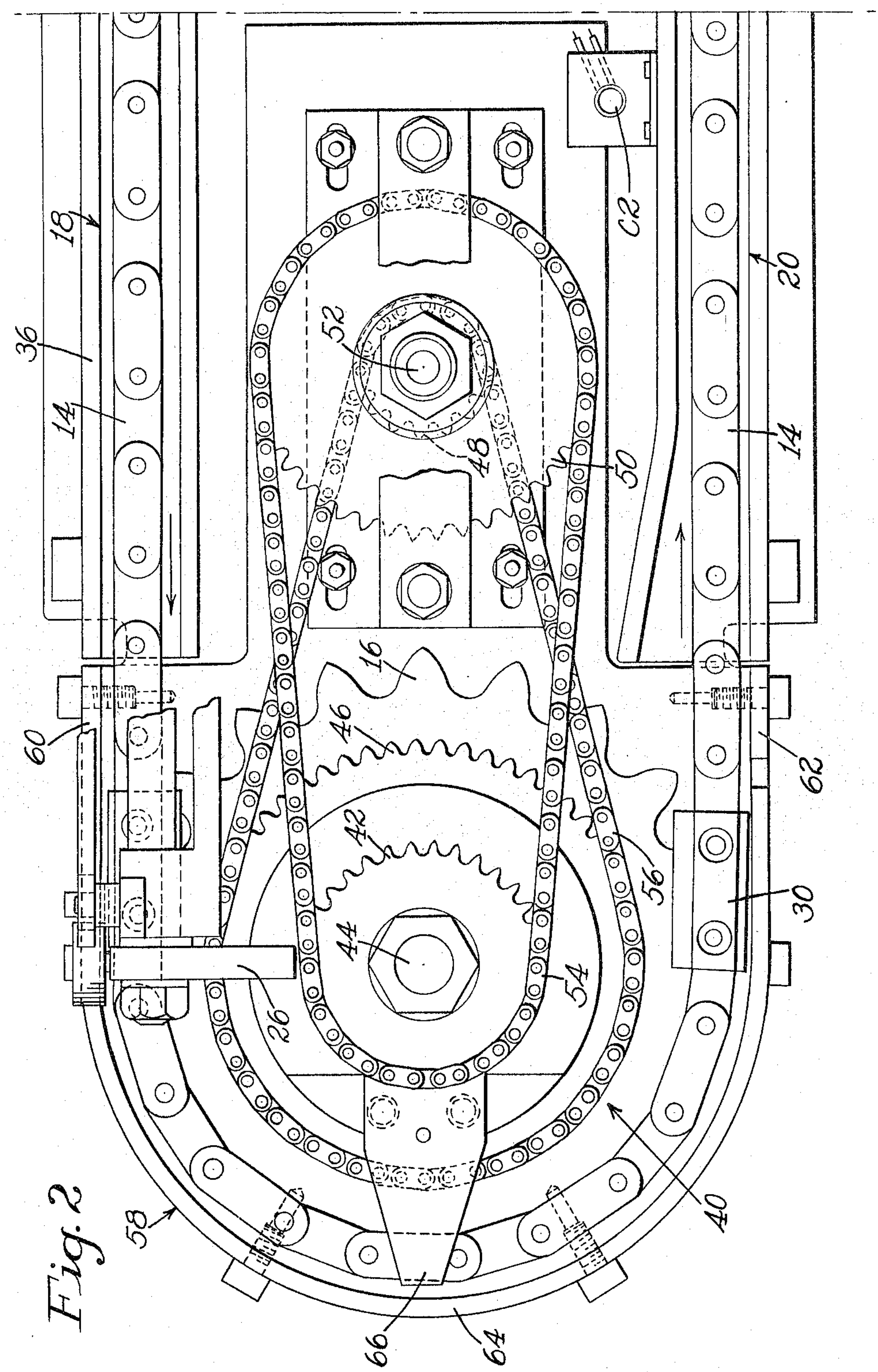
FIG. 2 is a top plan view of an end of the conveyor of FIG. 1 illustrating the transfer mechanism.

Thereafter, as the sprocket 46 rotates (counterclockwise as seen in FIG. 2), the tongue 66 engages the rear side of the latch plate (see FIG. 5) and thereby forces the rack to travel around the end of the conveyor with the rack being guided by the engagement of the latch plate with the guide rail 58. When the tongue 66 has rotated through just over 180°, the roller 34 passes from the medial position 64 down onto the end portion 62 of the guide rail (see FIG. 2) so that the latch plate is lowered into operative relation to the conveyor chain to be engaged by the next towing block 30, to be conveyed toward the next work station.

In the illustrated embodiment of the invention a pool stop P1 similar to the type described in the above-identified applications is provided at the end of the run 18 of the conveyor, and a second pool stop P2 may be provided in run 20 just downstream of the transfer mechanism.

Figure 3:
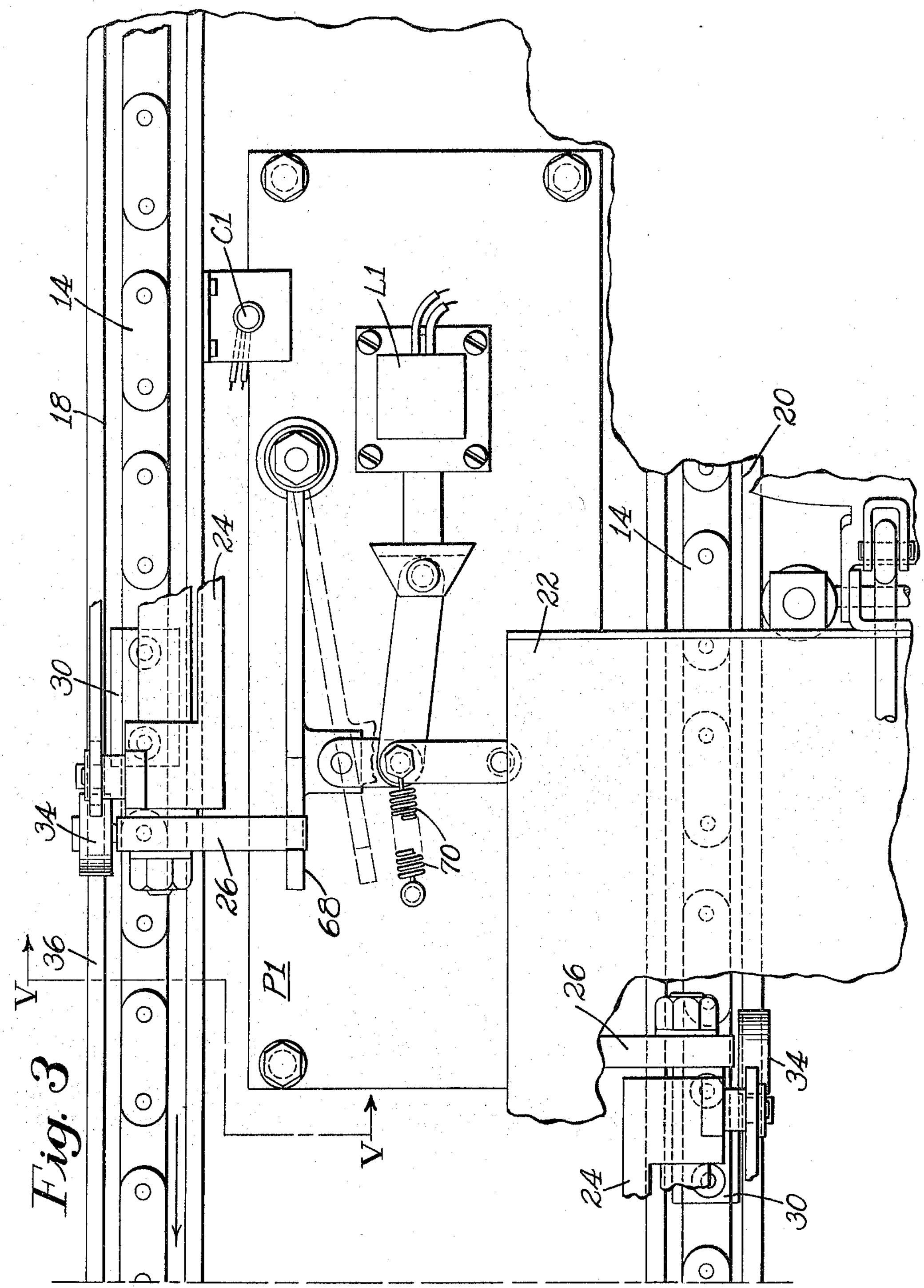
FIG. 3 is a top plan view of a portion of the conveyor adjacent the transfer mechanism, and is an extension of the right hand end of FIG. 2.
Figure 4:
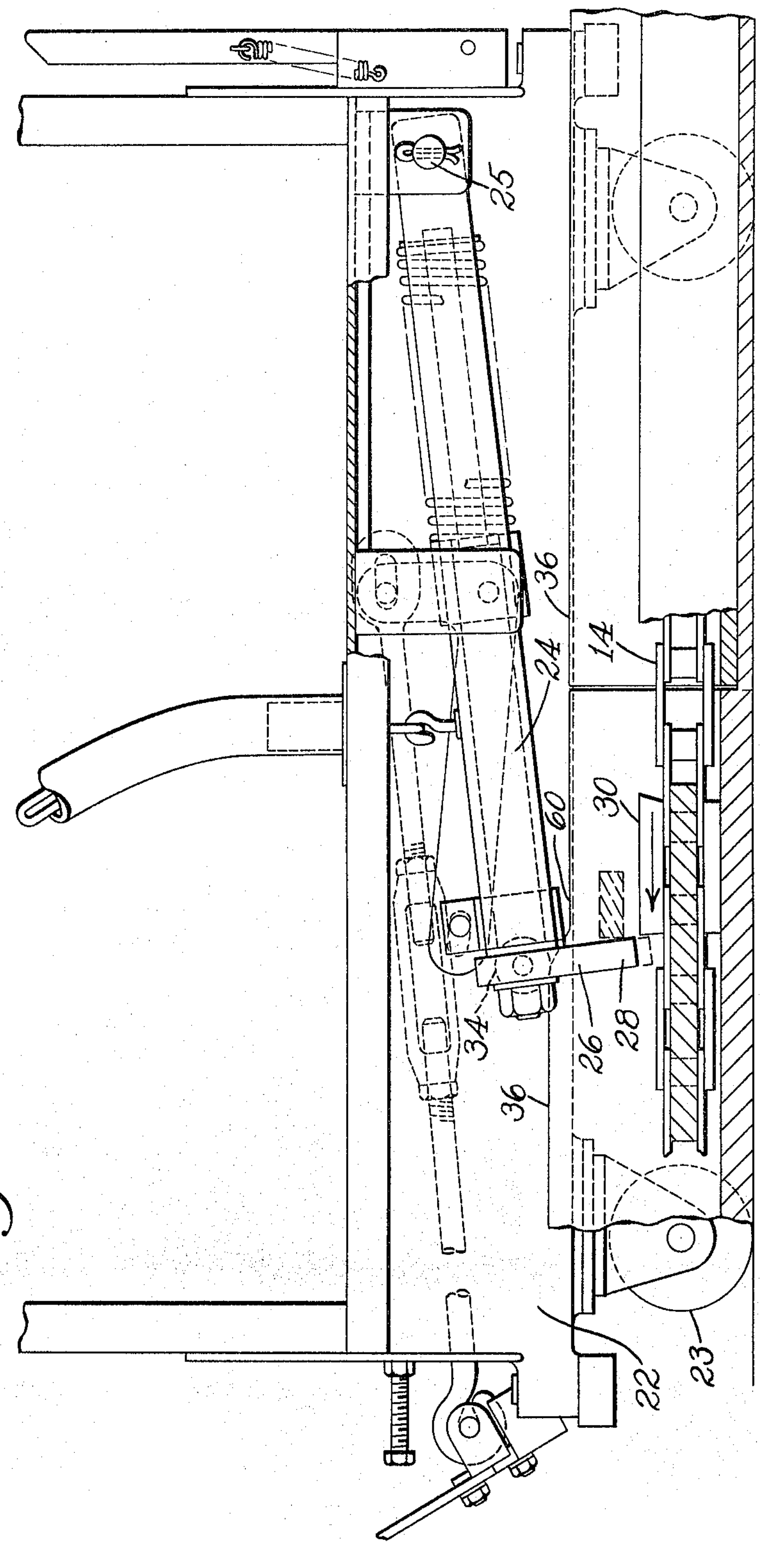
FIG. 4 is a view in side elevation of a rack disposed in operative relation to the conveyor entering the transfer mechanism.

The pool stop P1 comprises a stop arm 68 movable between a pass position in which the arm 68 is inclined away from the conveyor chain, and a stop position in which the arm 68 is disposed in generally parallel relation to the chain in position to cam the latch plate of a rack up out of engagement with the chain. (See FIG. 3.)

The position of the arm 68 is controlled by a spring 70 and a solenoid L1. The solenoid L1 is normally deenergized, so that the arm 68 is onrmally maintained in the stop position by the spring 70, and is moved to the pass position on energization of the solenoid L1.

The operation of the pool stop is controlled by photocells C1 (FIG. 3) and C2 (FIG. 2) and certain other circuit elements to be described, photocell C1 is disposed alongside the chain of run 18 of the conveyor upstream from the pool stop, in position to respond, by a decrease in conductivity, to the decrease in ambient light when a rack passes over the cell. Photocell C2 is positioned alongside the chain on run 20 of the conveyor downstream of the transfer mechanism, also positioned to respond, by a decrease in conductivity, to the decrease in ambient light when a rack passes over the cell.

During normal operation, with the conveyor energized, and no racks present at the pool stop or in the transfer mechanism, the solenoid L1 is not energized and the stop arm 68 is in the stop position.

When a rack approaches the pool stop and passes over cell C1, the resulting increase in resistance, due to the decrease in the amount of illumination received by the cell triggers transistors T3 and T4 to energize relay R2 which closes contacts R2X1 energizing relay R3 to close contacts R3X1 to energize solenoid L1, thereby moving the pool stop P1 to the pass position and permitting the rack to enter the transfer mechanism.

To prevent a second rack from entering the transfer mechanism until the first rack has been discharged, means is provided to retain the pool stop P1 in the stop position until the first rack has passed over the second photocell C2. For this purpose the energization of relay R3 also closes contacts R3X2 to energize relay R4, which closes contacts R4X1 to create a holding circuit to relay R4, and opens contacts R4X2 to break the circuit to relay R3. Contacts R3X1 thereby open, deenergizing the solenoid L1, permitting the stop arm 68 to return to the stop position.

Since the above circuit action is quite rapid, the stop arm is out of the stop position only momentarily, to permit the towing arm 24 and latch plate 26 to drop onto the conveyor chain. Because of the spacing between the towing blocks, the latch plate will probably not be engaged by a towing block instantly. Hence, when solenoid L1 is deenergized the arm 68 may be physically prevented from returning to the stop position until the latch plate has been moved away from the stop position.

To insure that the arm 68 remains in the stop position until the first rack has been discharged from the transfer mechanism, relay R4 remains energized, through contacts R4X1 after the solenoid L1 is deenergized so that contacts R4X2 in the circuit to relay R3 remain open. Hence, if there is a second rack immediately behind the first rack, or if one arrives at the pool stop before the first rack has been discharged from the transfer mechanism, the resulting energization of relay R2 cannot complete a circuit to R3 to energize the solenoid.

After the first rack has been discharged from the transfer mechanism, and covers photocell C2, the resulting decrease in resistance of cell C2 triggers transistors T1 and T2 to energize relay R1. Contacts R1X1 are thereby opened to deenergize relay R4, and contacts R4X2 in the circuit to relay R3 are closed. However, it is not desirable for relay R3 to be energized to actuate the stop mechanism at this time, since in some cases the rack may move into a position over the photocell C2 and then be stopped by other racks. Hence it is undesirable to permit a second rack to be released from the pool stop until the first rack has passed beyond the photocell C2. For this purpose the energization of relay R1, when the forward end of the first rack covers the cell, also opens contacts R1X2 in the circuit to relay R3. Hence even though a second rack is waiting at the pool stop, it will not be released until the first rack has passed beyond photocell whereby relay R1 is deenergized, and contacts R1X2 are closed to energize relay R3, to release the next rack from the pool stop.

Although in the illustrated embodiment, the detection of the presence of a rack at the entering and discharge sides of the transfer mechanism is accomplished by photocells, it will be apparent that the rack detection can be accomplished by other methods such as by mechanically actuated switches.

Since certain other obvious changes can be made in the device disclosed herein without departing from the scope of the invention, it is intended that all matter contained herein be interpreted in an illustrative and not a limiting sense.

Having thus described my invention, what I claim as new and desire to secure by Letters Patent of the United States is:

1. A conveyor system for transferring article carrying devices between work stations, comprising a first run for conveying devices in one direction and a second run extending from the end of the first run and in a different direction, transfer means adapted to transfer articles from the first run to the second run, a stop mechanism associated with the first run to control the entry of articles into the transfer means, and stop mechanism control means responsive to the entry of an article carrying device into the transfer mechanism to maintain said stop mechanism in the stop position until said article carrying device has passed a predetermined position on the second run of the conveyor.

2. A conveyor system for transferring article carrying devices between work stations, comprising a first run for conveying devices in one direction and a second run extending from the end of the first run and in a different direction, transfer means adapted to transfer articles from the first run to the second run, a stop mechanism associated with the first run to control the entry of articles into the transfer means, said stop mechanism being normally in the stop position, stop mechanism control means responsive to the approach of an article carrying device to the transfer means to open momentarily the stop means and to render itself inoperative until said article carrying device has passed a predetermined point on the second run of the conveyor.

3. A conveyor system for transferring article carrying devices between work stations, comprising a first run for conveying devices in one direction and a second run extending from the end of the first run and in a different direction, transfer means adapted to transfer articles from the first run to the second run, a stop mechanism associated with the first run to control the entry of articles into the transfer means, stop mechanism actuating means responsive to the approach of an article carrying device to the transfer means to open momentarily the stop means and to render said stop mechanism actuating means inoperative, and means responsive to the discharge of the article carrying device from the transfer mechanism onto the second run of the conveyor to render said stop mechanism actuating means operative.

4. A conveyor system for transferring article carrying devices between work stations, comprising a first run for conveying devices in one direction and a second run extending from the end of the first run and in a different direction, transfer means adapted to transfer articles from the first run to the second run, a stop mechanism associated with the first run to control the entry of articles into the transfer means, stop mechanism control means, including photo-responsive means positioned to be covered by an article carrying device approaching the transfer means, and control means responsive to the resulting change in electrical characteristics of the photo-responsive means to permit said article carrying device to pass said stop mechanism and to thereafter maintain said stop mechanism in the stop position.

5. A conveyor system as set forth in claim 4 in which second photo-responsive means is provided on the second run, and means is provided responsive to the movement of the article-carrying device past said second photoresponsive means for returning said control means to the original condition.

References Cited by the Examiner

UNITED STATES PATENTS

| | | | |
|---|---|---|---|
| 3,130,685 | 4/1964 | Goodrich et al. | 104—172 |
| 3,148,634 | 9/1964 | Goodrich | 104—172 |
| 3,158,105 | 11/1964 | Robbins et al. | 104—172 |
| 3,175,516 | 3/1965 | Bernard | 104—172 |
| 3,176,627 | 4/1965 | Bonnette | 104—172 |

ARTHUR L. LA POINT, *Primary Examiner.*

F. W. MONAGHAN, *Assistant Examiner.*